3,056,787
PROCESS FOR THE PREPARATION OF
PIPERAZINES
Emil Lorz and Richard S. Bagby, Springfield, Mo., assignors to Hoffman-Taff, Inc., Springfield, Mo., a corporation of Missouri
No Drawing. Filed Apr. 19, 1961, Ser. No. 103,987
3 Claims. (Cl. 260—268)

This invention relates to an improved process for the preparation of piperazine and substituted piperazine compounds. These products, hereinafter referred to as piperazines, have known uses as pharmaceuticals and as starting materials for preparation of a great number of useful products.

It is known to prepare piperazines by cyclizing ethanol amine hydrohalide as is disclosed in U.S. Patent No. 2,839,533, diethylenetriamine as disclosed in U.S. Patent No. 2,901,482, and N-aminoethyl ethanol amine as disclosed in U.S. Patent No. 2,479,657 and U.S. Patent No. 2,427,243. Other methods of preparation are known but are not of importance as commercial methods of preparation.

The mechanism for the cyclization depends on the treatment of the starting ethanol amines or polyamines under heat and pressure, usually in the vapor phase in the presence of catalysts to bring about the cyclization of the starting amines usually by the elimination of water and/or ammonia.

Most of the above methods require the use of expensive pressure equipment, recycling of the reaction mixture in order to obtain economical yields and the use of catalysts which must be periodically replenished or renewed. All of these factors add to the cost of the process.

Furthermore, isolation of the desired product is complicated by the presence of by-products and unreacted starting materials which, being basic and having chemical properties essentially similar to the desired piperazine, must be separated therefrom. The best yields reported for the prior art processes range from about 50 to about 85%.

In those processes not requiring the use of pressure or catalysts, such as heating the hydrohalide of ethanol amine, an inert high boiling solvent is used in temperature ranges from 250 to 300° C. (e.g., the process of U.S. Patent No. 2,839,533). Since these solvents are expensive and may also contaminate the product due to decomposition after heating for extended periods of time, they further complicate the process and add to the cost thereof.

An object of the invention is to provide a simple, economical method for producing piperazines in relatively high yields.

Another object of the invention is to prepare piperazines in relatively high yields by a process that does not require the use of pressure equipment, catalysts, recycling of reaction products or expensive solvents and which yields essentially the pure piperazine compound as the end product, free from contaminating by-products.

A further object of the invention is to provide an improved process for producing piperazines which involves the use of a novel intermediate process step.

Essentially, the method comprises heating a diacid salt of an aminoethyl ethanol amine compound represented by the general formula:

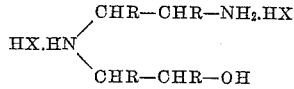

where X is an anion of an acid group and R may be hydrogen or a lower alkyl group containing from 1 to 4 carbon atoms, to a temperature of from 200–250° C. until the cyclization is complete, as is evidenced by the fact that water, which is formed as a by-product in the reaction, ceases to be evolved and the reaction mass becomes solid. The reaction may be conducted at atmospheric pressure in open vessels (under a hood), or in distillation equipment utilized in the product recovery steps. No catalyst is necessary.

It has been discovered that the diacid salts of aminoethyl ethanol amines are much more readily cyclized by heating than the compounds heretofore used.

The reaction product is cooled to approximately 50–70° C. and a strongly alkaline solution is added, whereupon the solid mass liquefies and the piperazine base is liberated. A solution of caustic soda or other suitable alkaline substance may be used for this purpose. The resulting solution is distilled at atmospheric pressure and piperazine and water distill over. The fraction boiling between 90–150° C. is collected and contains from 70–80% pure piperazine compound.

The optimum conditions for the cyclization reaction will, obviously, vary with the particular amino alkanolamine hydrohalide which is being reacted. Normally, the reaction may be carried out at a temperature between 200 and 250° C., but the most advantageous range is from about 240 to 250° C.

As is apparent from the nature of the reaction, the process is conveniently conducted by batchwise techniques. The portion "HX" of the diacid salt may be any convenient acid or acid salt capable of readily forming addition salts with amines. For example "X" may represent a halogen such as chlorine or bromine, the resulting diacid salt being a dihydrochloride or bromide. The salt may be prepared from the amino ethanolamine as an initial step in the overall process without recovery from the reaction vessel. In forming the acid salt, an acid is added to the amino alkanolamine until a pH of about 2 is obtained.

The invention is further illustrated by the following examples:

*Example 1*

A one-liter Pyrex three-neck flask containing 177 grams of β-hydroxyethyl-ethylene-diamine dihydrochloride and equipped with thermometer, agitator and condenser set for distillation is heated slowly in an oil bath until the solid melts at about 115° C. The heating is continued until the temperature of the bath reaches 220° C., at which time water begins to distill slowly. When the temperature reaches approximately 240–250° C., the melt becomes semisolid and after about three hours solidifies completely and the distillation of water ceases, indicating that the reaction is complete. The reaction mixture is cooled and basified with 160 grams 50% sodium hydroxide solution, whereupon the solid gradually dissolves and sodium chloride precipitates out. The precipitated salt is filtered off and the filtrate is distilled at atmospheric pressure. The fraction boiling between 90 and 150° C. is collected and consists of a water solution of pure piperazine containing 64 grams of piperazine, or approximately 75% yield.

*Example 2*

To a suitable reaction flask containing 104 grams (1 mole) of β-amino ethyl ethanolamine is added with stirring 210 ml. (2 ounces) of concentrated HCl, to a final pH of 2. The flask is then heated, whereupon the dihydrohalide salt forms and water is distilled off. Heating is continued as in Example 1 and the reaction products are worked up in the same manner. The resulting distillate contained 64 grams of pure piperazine, or about 75% of the theoretical yield.

Similarly, high yields of alkyl-substituted piperazines (e.g., 2,5-dimethyl, 2,5-diethyl, etc.) are readily prepared from the diacid salts of the corresponding alkyl-substituted amino ethyl ethanolamines. It will be understood that the alkyl substituents on the basic compound may be the same or different and that any one or more of the hydrogen atoms may be substituted with an alkyl group.

We claim:

1. A method for preparing a piperazine product of the formula (1) 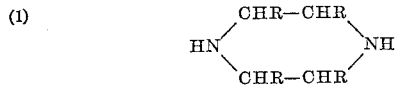

wherein each R is selected from the group consisting of a hydrogen atom and an alkyl radical of 1 to 4 carbon atoms, from an alkanol diamine diacid salt represented by the formula:

(2) 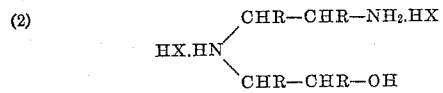

wherein R is representative of the same group as in Formula 1 and X is an anion of a salt-forming group, which consists of cyclizing said alkanol diamine diacid salt by heating to a temperature of from 200 to 250° C. until water ceases to be driven off and the reaction mass solidifies, adding alkaline solution to basify the resultant solid reaction product and recovering the piperazine product therefrom.

2. The method of claim 1 wherein the diacid salt is a dihydrohalide.

3. The method of claim 1 wherein the solid reaction product is dissolved in alkaline solution and the piperazine product is recovered by distilling said solution at atmospheric pressure, and collecting the fraction boiling between 90 and 150° C. whereby a product containing substantially pure piperazine compound is obtained.

4. The method of claim 3 wherein said reaction product is cooled to approximately 50 to 70° C. before addition of said alkaline solution.

5. The method according to claim 1 wherein the alkanol diamine dihydrohalide being cyclized is β-hydroxyethyl-ethylene diamine dihydrochloride.

6. A process for preparing a piperazine product having the formula

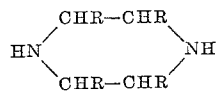

wherein each R is independently selected from the group consisting of a hydrogen atom and an alkyl radical of from 1 to 4 carbon atoms, from an alkanol diamine which is represented by the formula

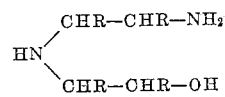

wherein R represents the same radicals recited heretofore, which consists of acidifying said alkanol diamine with concentrated halogen acid to a pH of about 2, heating the reaction medium to distill off the water and form a liquid mass, further heating said liquid mass until it solidifies, cooling the reaction mass to about 50° C., adding alkaline solution to basify the cooled reaction mass and recovering the piperazine compound therefrom.

7. The method of claim 6 wherein the reaction mass is basified by dissolution in caustic solution and piperazine is recovered from the solution by distilling and collecting the fraction boiling between 90 and 150° C.

8. The method of claim 6 wherein the alkanol diamine is β-aminoethyl ethanolamine.

References Cited in the file of this patent

UNITED STATES PATENTS 2,843,590    Scigliano et al.  ---------- July 15, 1958

FOREIGN PATENTS 589,040    Canada ---------------- Dec. 15, 1959